United States Patent
Siqueira et al.

(10) Patent No.: US 9,616,787 B2
(45) Date of Patent: Apr. 11, 2017

(54) SEAT ASSEMBLY

(71) Applicant: GM GLOBAL TECHNOLOGY OPERATIONS LLC, Detroit, MI (US)

(72) Inventors: Fernando A. Siqueira, Sao Bernardo do Campo (BR); Adelchi R. Tiboni, Sao Paulo (BR); Thiago Canola Afonso, Sao Paulo (BR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/848,997

(22) Filed: Sep. 9, 2015

(65) Prior Publication Data

US 2017/0066351 A1    Mar. 9, 2017

(51) Int. Cl.
*B60N 2/46* (2006.01)
*B60N 2/01* (2006.01)

(52) U.S. Cl.
CPC ............ *B60N 2/4613* (2013.01); *B60N 2/01* (2013.01)

(58) Field of Classification Search
CPC ...... B60N 2/46; B60N 2/4606; B60N 2/2626; B60N 2/2673; B60N 2/4626; B60N 2/4673
USPC ............... 296/1.09, 57.1; 297/411.2, 411.23, 297/411.25, 411.3, 411.32, 441, 26, 297/411.29, 251, 254, 256.16, 255, 238
See application file for complete search history.

(56) References Cited

U.S. PATENT DOCUMENTS

| | | | | |
|---|---|---|---|---|
| 2006/0220409 A1* | 10/2006 | Smith | ................ | B62D 33/0273 296/57.1 |
| 2008/0252094 A1* | 10/2008 | Schulte | ............. | B62D 33/0273 296/57.1 |
| 2012/0223564 A1* | 9/2012 | Andersson | ........... | B60N 2/4673 297/411.3 |

* cited by examiner

*Primary Examiner* — Dennis H Pedder
(74) *Attorney, Agent, or Firm* — Quinn IP Law

(57) ABSTRACT

A seat assembly includes a seat base and a seatback disposed proximal to the seat base. The seatback includes a seatback body and an armrest movably coupled to the seatback body. As such, the armrest can move relative to the seatback body among a closed position, a release position, and an open position. The armrest is removably coupled to the seatback body. Therefore, the armrest can be removed from the seatback body only when the armrest is in the release position.

15 Claims, 6 Drawing Sheets

SEAT ASSEMBLY

TECHNICAL FIELD

The present disclosure relates to seat assemblies for vehicles. In particular, the present disclosure relates to a seat assembly with a removable armrest.

BACKGROUND

Vehicles typically include seats inside the passenger compartment. In addition, booster seats may be placed on the seat, thereby allowing small children to sit on the booster seats instead of directly on the vehicle seats.

SUMMARY

In the present disclosure, the seat assembly includes a removable armrest that can serve as a booster seat once it is removed from the seat assembly. In one embodiment, the seat assembly includes a seat base and a seatback disposed proximal to the seat base. The seatback includes a seatback body and an armrest movably coupled to the seatback body. As such, the armrest can move relative to the seatback body among a closed position, a release position, and an open position. The armrest is removably coupled to the seatback body. Therefore, the armrest can be removed from the seatback body only when the armrest is in the release position. The present disclosure also describes vehicles including a seat assembly as described above.

The above features and advantages and other features and advantages of the present teachings are readily apparent from the following detailed description of the best modes for carrying out the teachings when taken in connection with the accompanying drawings.

DETAILED DESCRIPTION

Referring to the drawings, wherein like reference numbers correspond to like or similar components throughout the several figures, and beginning with FIGS. 1-4, a vehicle 10 includes a vehicle body 12, which defines a passenger compartment 14. Although the vehicle 10 is depicted as a car, it is contemplated that the vehicle 10 may be an aircraft, a boat, a hovercraft, or any other suitable kind of vehicle. Regardless, the vehicle 10 includes a seat assembly 100 inside the passenger compartment 14. The seat assembly 100 includes a seat base 102 and a seatback 104 disposed proximal to the seat base 102. The seat base 102 is configured, shaped, and sized to support the weight of a vehicle occupant and is therefore oriented horizontally relative to the vehicle body 12. During use, the vehicle occupant sits on the seat base 102, and the seat base 102 can support the vehicle occupant's weight.

The seat base 102 may be directly coupled to the seatback 104 or otherwise operatively coupled to the seat base 102 in order to allow a vehicle occupant to rest his back on the seatback 104 while he sits on the seat base 102. Further, the seatback 104 may abut the seat base 102. In the depicted embodiment, the seatback 104 includes a seatback body 106 having a first or front body surface 108 and a second or rear body surface 110 opposite the first body surface 108. The first body surface 108 may be referred to as a cushioning surface. In addition, the seatback body 106 has a top or first seatback edge 105 and a second or bottom seatback edge 107 opposite the first seatback edge 105. The seat base 102 is closer to the second seatback edge 107 than to the first seatback edge 105.

The seatback 104 also includes an armrest 112 movably coupled to the seatback body 106. In the depicted embodiment, the armrest 112 is movably coupled to the seatback body 106 at a location M that is closer to the second seatback edge 107 than to the first seatback edge 105. The armrest 112 has a first or front armrest surface 114 and a second or rear armrest surface 116 opposite the first armrest surface 114. The first armrest surface 114 may be referred to as the cushioning surface, whereas the second armrest surface 114 may be referred to as the arm supporting surface. The armrest 112 further includes a cushion 126 and a support frame 128 (FIG. 15) supporting the cushion 126. The support frame 128 is movably coupled to the seatback body 106.

Figure 3:
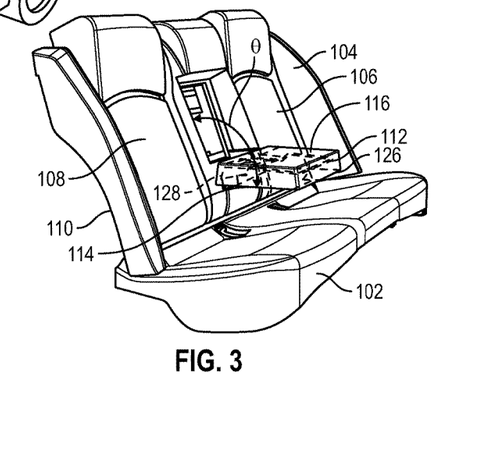
FIG. 3 is a schematic, perspective view of the seat assembly shown in FIG. 1, showing the armrest in the open position.
Figure 4:
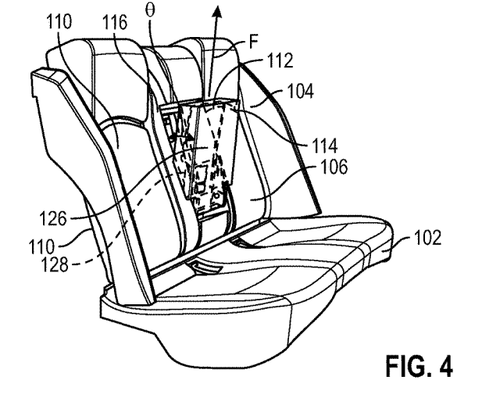
FIG. 4 is a schematic, perspective view of the seat assembly shown in FIG. 1, showing the armrest in the release position.

As discussed above, the armrest 112 is movably coupled to the seatback body 106. For example, the armrest 112 may be rotationally coupled to the seatback body 106 or otherwise movably connected to the seatback body 106. Irrespective of the specific movable connection employed, the armrest 112 can move relative to the seatback body 106 among a closed position (FIG. 2), an open position (FIG. 3), and a release position (FIG. 4).

In the closed position, the armrest 112 is substantially flush with the seatback body 106 in order to allow the vehicle occupant to comfortably rest his back on the seatback 104 while he sits on the seat assembly 100. In particular, when the armrest 112 is in the closed position relative to the seatback body 106, an angle θ between the first body surface 108 of the seatback body 106 and the first armrest surface 114 of the armrest 112 is about zero degrees (0°) in order to allow the vehicle occupant to comfortably rest his back on the seatback 104 while he sits on the seat assembly 100. While in the closed position, the armrest 112 is movably attached to the seatback body 106.

Figure 1:
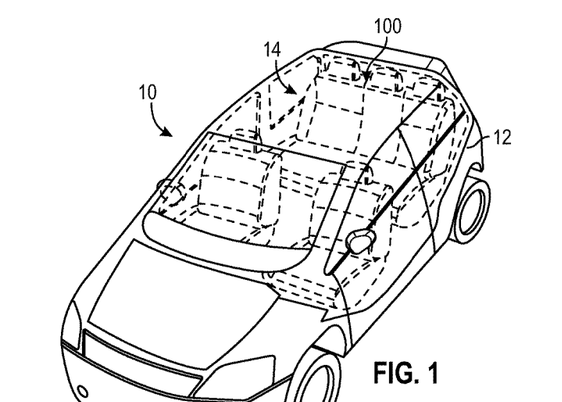
FIG. 1 is a schematic, perspective view of a vehicle including a seat assembly inside the passenger compartment.
Figure 2:
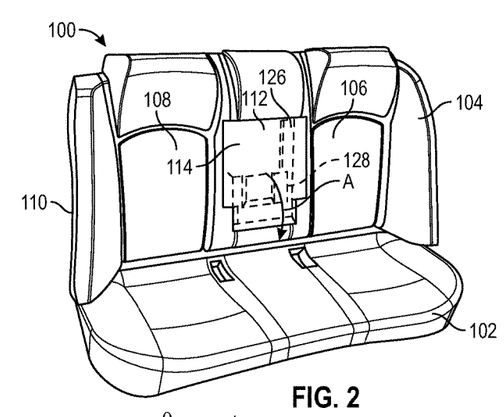
FIG. 2 is a schematic, perspective view of the seat assembly shown in FIG. 1, wherein the seat assembly includes a removable armrest shown in the closed position.

The armrest 112 can be moved relative to the seatback body 106 from the closed position to the open position. To do so, a vehicle occupant can pull the armrest 112 away from the second body surface 110 of the seatback body 106 in order to move the armrest 112 in the direction indicated by arrow A (FIG. 2). Once in the open position, the armrest 112 is oriented at an obtuse angle relative to the seatback body 106 in order to allow a vehicle occupant sitting on the seat assembly 100 to comfortably rest his arm on the armrest 112. Specifically, when the armrest 112 is in the open position, the angle θ between the first body surface 108 of the seatback body 106 and the first armrest surface 114 of the armrest 112 is about one hundred ten degrees (110°) in order to allow a vehicle occupant sitting on the seat assembly 100 to comfortably rest his arm on the armrest 112.

In addition to the open position, the armrest 112 can be placed in a release position (FIG. 4) in order to decouple the armrest 112 from the seatback body 106. The armrest 112 can be decoupled (and removed from) the seatback body 106 (without damaging or disassembling the seat assembly 100) only when the armrest 112 is in the release position. The release position is located between the closed position (FIG. 2) and the open position (FIG. 3). Accordingly, to move the armrest 112 to the release position, the vehicle occupant can move the armrest 112 relative to the seatback body 106 from the closed position toward the open position in the direction indicated by arrow A (FIG. 2) until the armrest 112 reaches the release position (FIG. 4). Once in the release position, the vehicle occupant can apply a force F to the armrest 112 in order decouple the armrest 112 from the seatback body 106. In the release position, the armrest 112 is obliquely angled relative to the seatback body 106 in order to facilitate removal of the armrest 112 from the seatback body 106. For example, when the armrest 112 is in the release position, the angle θ between the first body surface 108 of the seatback body 106 and the first armrest surface 114 of the armrest may range between fifteen degrees (15°) and 100 degrees (100°) in order to prevent, or at least inhibit, the armrest 112 from being decoupled from the seatback body 106 when the armrest 112 is close to the open position or the closed position. It is desirable to prevent, or at least inhibit, the armrest 112 from being decoupled from the seatback body 106 when the armrest 112 is near the closed position in order to allow the vehicle occupant to comfortably seat on the seat assembly 100 even if the armrest 112 slightly moves from the closed position toward the open position. Likewise, it is desirable to prevent, or at least inhibit, the armrest 112 from being decoupled from the seatback body 106 when the armrest 112 is near the open position in order to maintain the armrest 112 in a fixed position within the passenger compartment 14 in case an external force is exerted on the vehicle body 12. In the depicted embodiment, when the armrest 112 is in the release position, the angle θ between the first body surface 108 of the seatback body 106 and the first armrest surface 114 of the armrest is about twenty-four degrees (24°) in order to maintain the armrest 112 from being decoupled from the seatback body 106 for the reasons stated above.

Figure 5:
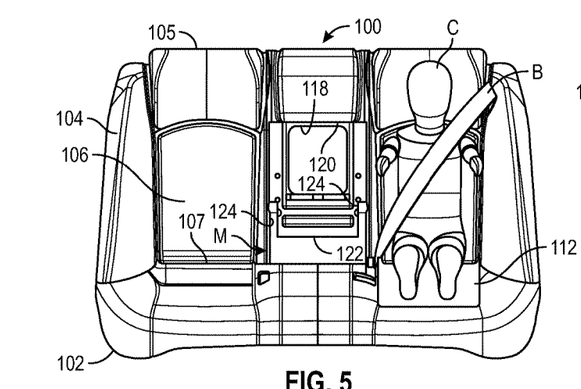
FIG. 5 is a schematic, perspective view of the seat assembly shown in FIG. 1 and a child seated on the armrest, which functions as a booster seat.
Figure 6:
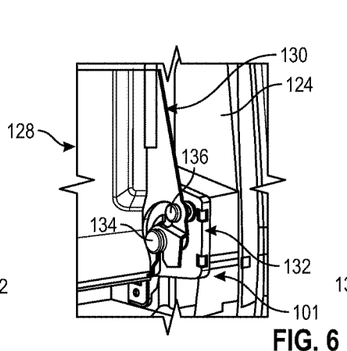
FIG. 6 is a schematic, perspective view of part of a release mechanism of the seat assembly.
Figure 7:
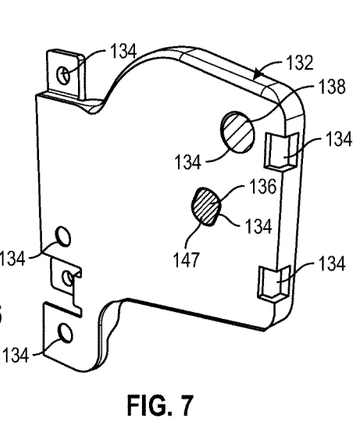
FIG. 7 is a schematic, perspective view of a coupling frame of the release mechanism shown in FIG. 6.
Figure 8:
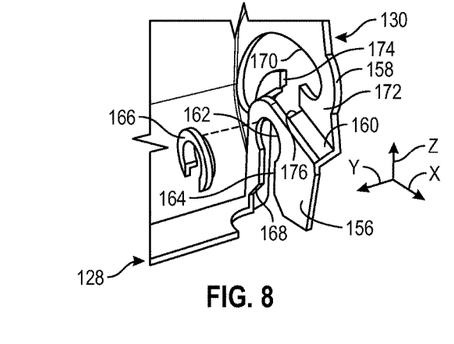
FIG. 8 is a schematic, perspective, exploded view of a support frame, a coupling flange, and a bearing of the release mechanism shown in FIG. 6.
Figure 9:
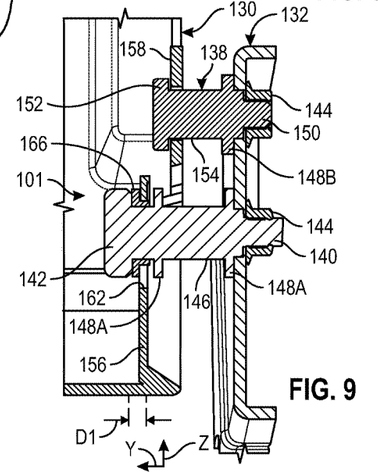
FIG. 9 is a schematic, cross-sectional view of part of the release mechanism shown in FIG. 6, depicting the support frame, the coupling frame, the coupling flange, and two pins connecting the coupling flange to the coupling frame.
Figure 10:
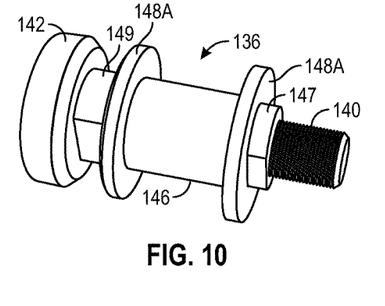
FIG. 10 is a schematic, perspective view of a pivot pin of the release mechanism shown in FIG. 6.
Figure 11:
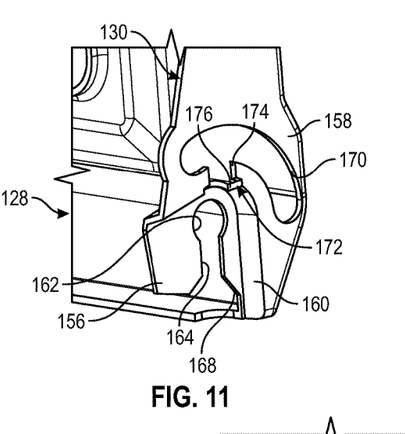
FIG. 11 is a schematic, perspective view of the support frame and the coupling flange of the release mechanism shown in FIG. 6.

With reference to FIG. 5, once decoupled from the seatback body 106, the armrest 112 can be placed on top of the seat base 102, thereby allowing the armrest 112 to function as a child booster seat. A child C can then be seated on the armrest 112 (which functions as a booster seat), and the seatbelt B can be buckled in order to secure the child C in the passenger compartment 14. The armrest 112 can be recoupled to the seat assembly 100 by at least partially inserting the armrest 112 in a seat cavity 118 of the seatback body 106. To do so, the armrest 112 should be inserted in the seat cavity 118 oriented in the release position. The seat cavity 118 is configured, shaped, and sized to receive the armrest 112 and is defined by a first or top wall 120, a second or bottom wall 122, and at least two sidewalls 124 of the seatback body 106. Each sidewall 124 interconnects the first wall 120 and the second wall 122. In the closed position, the majority of the armrest 112 is disposed inside the seat cavity 118 in order to allow the vehicle occupant to comfortably rest his back on the seatback 104 while he seats on the seat assembly 100.

The seat assembly 100 includes a release mechanism 101 movably coupling the seatback body 106 to the armrest 112. The release mechanism 101 removably couples the armrest 112 to the seatback body 106. Consequently, the armrest 112 can be completely removed from the seatback body 106 only when the armrest 112 is in the release position (FIG. 4). When the armrest 112 is removed from the seatback body 106, no portion of the armrest 112 is directly or indirectly coupled to the seatback body 106.

With reference to FIGS. 6-11, the release mechanism 101 includes at least one coupling flange 130 directly extending from the support frame 128. The coupling flange 130 may be integrally formed with the support frame 128 so as to form a one-piece structure. In the depicted embodiment, the release mechanism 101 includes two coupling flanges 130 extending from opposing sides to the support frame 128. Each coupling flange 130 is movably (and removably) coupled to a sidewall 124 of the seatback body 106.

The release mechanism 101 includes at least one coupling frame 132 movably coupling the support frame 128 to the seatback body 106 via the coupling flange 130. The coupling frame 132 may be directly coupled to the seatback body 106. Specifically, the coupling frame 132 may be directly coupled to at least one of the sidewalls 124 of the seatback body 106. In the depicted embodiment, two coupling frames 132 are each coupled to one of the sidewalls 124 of the seatback body 106. Each coupling frame 132 is fixed to the seatback body 106 and, therefore, the coupling frames 132 remain stationary relative to the seatback body 106 while the armrest 112 can move relative to the seatback body 106.

The coupling frame 132 is made of a rigid material, such as a rigid metal or a rigid polymer, in order to support the load of a vehicle occupant's arm resting on the armrest 112. In the depicted embodiment, the coupling frame 132 has a plurality of holes 134 configured, shaped, and sized to receive fasteners. The fasteners can be inserted through the holes 134 and into the seatback body 106 in order to couple the coupling frame 132 to the seatback body 106. One of the holes 134 of the coupling frame 132 is configured, shaped, and sized to receive a first pin 136 such that the first pin 136 remains stationary relative to the coupling frame 132 and the seatback body 106. As such, the first pin 136 cannot rotate or translate relative to the coupling frame 132 and the seatback body 106. Another hole 134 of the coupling frame 132 is configured, shaped, and sized to receive a second pin 138 such that the second pin 138 remains stationary relative to the coupling frame 132 and the seatback body 106. As such, the second pin 138 cannot rotate or translate relative to the coupling frame 132 and the seatback body 106. The first pin 136 may be referred to as the pivot pin because the armrest 112 can pivot relative to the seatback body 106 about the first pin 136, whereas the second pin 138 may be referred to as a guide pin because it helps guide the movement of the armrest 112 relative to the seatback body 106.

The first pin 136 has a first externally threaded end portion 140 and a first enlarged end portion 142 opposite to the first externally threaded end portion 140. The first externally threaded end portion 140 can threadedly mate with a nut 144 in order to couple the first pin 136 to the coupling frame 132. Specifically, the nut 144 can be threaded to the first externally threaded end portion 140 of the first pin 136 and tightened against the coupling frame 132, thereby coupling the first pin 136 to the coupling frame 132. The cross-sectional dimension (e.g., diameter) of the first enlarged end portion 142 may be larger than the rest (or at least most) of the first pin 136 in order to securely couple the first pin 136 to the coupling flange 130.

The first pin 136 additionally includes a first pin body 146 and two annular flanges 148A disposed about the first pin body 146. The annular flanges 148A assist in coupling the first pin 136 to the coupling frame 132 and the coupling flange 130. In the depicted embodiment, one of the annular flanges 148A is closer to the first externally threaded end portion 140 than to the first enlarged end portion 142 and is configured to abut the coupling frame 132 when the nut 144 is tightened to the first externally threaded end portion 142 of the first pin 136. The other annular flange 148A is closer to the first enlarged end portion 142 than to the first externally threaded end portion 140 and helps maintain the first pin 136 coupled to the coupling flange 130.

The first pin 136 further includes a first locking portion 147 configured, shaped, and sized to be tightly disposed (e.g., pressed-fitted) in one of the holes 134 of the coupling frame 132. In other words, at least one of the holes 134 of the coupling frame 132 is configured, shaped, and sized to tightly receive the first locking portion 147 of the first pin 136 such that the first pin 136 remains stationary relative coupling frame 132 and the seatback body 106. Consequently, the first pin 136 cannot rotate or translate relative to the coupling frame 132 and the seatback body 106. The first locking portion 147 can be disposed between one of the annular flanges 148A and the first externally threaded end portion 140 of the first pin 136. The first pin 136 includes a second locking portion 149 disposed between the first enlarged end portion 142 and one of the annular flanges 148A of the first pin 136. As discussed below, the second locking portion 149 of the first pin 136 can be coupled to the coupling flange 130, so as to prevent the armrest 112 from being decoupled from the seatback body 106 unless the armrest 112 is in the release position.

The second pin 138 has a second externally threaded end portion 150 and a second enlarged end portion 152 opposite to the second externally threaded end portion 150. The second externally threaded end portion 150 can threadedly mate with another nut 144 in order to couple the second pin 138 to the coupling frame 132. Specifically, the nut 144 can be threaded to the second externally threaded end portion 150 of the second pin 138 and tightened against the coupling frame 132, thereby coupling the second pin 138 to the coupling frame 132. The cross-sectional dimension (e.g., diameter) of the second enlarged end portion 152 may be larger than the rest (or at least most) of the second pin 138 in order to securely couple the second pin 138 to the coupling flange 130.

The second pin 138 additionally includes a second pin body 154 and at least one annular flange 148B disposed about the second pin body 154. The annular flange 148B assists in coupling the second pin 138 to the coupling frame 132. In the depicted embodiment, the annular flange 148B is closer to the second externally threaded end portion 150 than to the second enlarged end portion 152 and is configured to abut the coupling frame 132 when the nut 144 is tightened to the second externally threaded end portion 150 of the second pin 138. The second enlarged end portion 152 of the second pin 138 abuts the coupling flange 130 in order to facilitate a connection between the second pin 138 and the coupling flange 130.

The coupling flange 130 includes a first flange portion 156 and a second flange portion 158 coupled to the first flange portion 156. A connecting wall 160 may interconnect the first flange portion 156 and the second flange portion 158. The first flange portion 156 and the second flange portion 158 may both have a substantially planar shape in order to minimize the space occupied by the release mechanism 101 in the seat assembly 100. The first flange portion 156 is spaced apart from the second flange portion 158 along a first or lateral direction Y by a distance D1 in order to allow the first pin 136 and the second pin 138 to serve its different purposes without interfering with each other. As stated above, the first pin 136 serves as a pivot and therefore allows the armrest 112 to rotate relative to the seatback body 106, and the second pin 138 serves as a guide and helps guide the movement of the armrest 112 relative to the seatback body 106.

Figure 14:
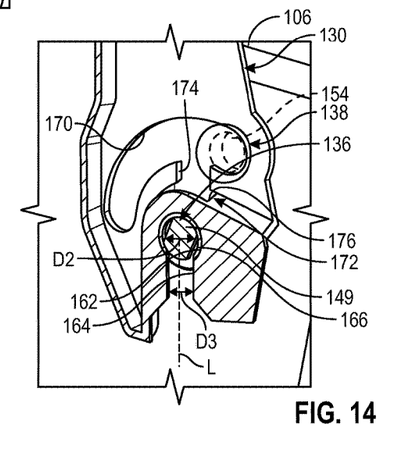
FIG. 14 is a schematic, cross-sectional enlarged, perspective view of part of the release mechanism shown in FIG. 6 when the armrest is in the closed position.

The coupling flange 130 defines an opening 162 and a linear slot 164 both extending through the first flange portion 156. The linear slot 164 is in direct communication with the opening 162 and extends (i.e., is elongated) along a second direction Z, which is perpendicular to the first direction Y. Specifically, the linear slot 164 is elongated along a longitudinal axis L (FIG. 14). The coupling flange 130 extends from the support frame 128 in a third direction X, which is perpendicular to the first direction Y and the second direction Z, when the armrest 112 is in the closed position. The opening 162 is configured, shaped, and sized to receive a bearing 166 and the second locking portion 149 of the first pin 136. The bearing 166 at least partially surrounds the second locking portion 149 of the first pin 136. Because the opening 162 is in direct communication with the linear slot 164, the first pin 136 can move from the opening 162 to the linear slot 164 when the armrest 112 is in the release position and the force F (FIG. 4) is applied to the armrest 112 in order decouple the armrest 112 from the seatback body 106. In other words, the first pin 136 can exit the opening 162 only when the armrest 112 is in the release position and the force F (FIG. 4) is applied to the armrest 112 in order decouple the armrest 112 from the seatback body 106. However, as discussed below, the shape and size of the second locking portion 149 do not allow the first pin 136 to move from the opening 162 to the linear slot 164 unless the armrest 112 is in the release position relative to the seatback body 106. The coupling flange 130 also has a flared passage 168 extending through the first flange portion 156. The flared passage 168 is in direct communication with the linear slot 164, thereby allowing the coupling flange 130 to be completely decoupled from the first pin 136. The flared passage 168 also facilitates recoupling the coupling flange 130 to the first pin 136 after the armrest 112 has been removed from the seatback body 106.

The coupling flange 130 also has a curved slot 170 extending through the second flange portion 158. The entire curved slot 170 may be shaped as an arc in order to guide the movement of the armrest 112 relative to the seatback body 106 when the second pin 138 is disposed in the curved slot 170. Specifically, the curved slot 170 is configured, shaped, and sized to slidably receive the second pin body 154 of the second pin 138, thereby allowing the support frame 128 to move with respect to the seatback body 106.

The coupling flange 130 also has an aperture 172 extending through the second flange portion 158 and the connecting wall 160. The aperture 172 is in direct communication with the curved slot 170 in order to allow the second pin 138 to exit the curved slot 170 only when the armrest 112 is in the release position relative to the seatback body 106. The aperture 172 includes a first aperture portion 174 extending through the second flange portion 158 and a second aperture portion 176 extending through the connecting wall 160. The first aperture portion 174 is in direct communication with the second aperture portion 176 and is configured, shaped, and sized to receive the second pin body 154 of the second pin 138, but not its second enlarged end portion 152. As such, the second pin 138 can exit the curved slot 170 through the first aperture portion 174 when the armrest 112 is in the release position and the force F (FIG. 4) is applied to the armrest 112 in order decouple the armrest 112 from the seatback body 106. The thickness of the second enlarged end portion 152 of the second pin 138 is larger than the thickness of the first aperture portion 174. As such, the second enlarged end portion 152 of the second pin 138 helps maintain the coupling flange 130 connected to coupling frame 132. The second aperture portion 176 is configured, shaped, and sized to receive the second enlarged end portion 152 of the second pin 138. Accordingly, the second enlarged end portion 152 of the second pin 138 can be received by the second aperture portion 176 when the armrest 112 is in the release position and the force F (FIG. 4) is applied to the armrest 112 in order decouple the armrest 112 from the seatback body 106. The second aperture portion 176 of the aperture 172 and the linear slot 164 are aligned with each other in order to allow the second pin 138 to exit the curved slot 170 at the same time as the first pin 136 exits the opening 162, thereby facilitating removal of the armrest 112 from the seatback body 106.

Figure 12:
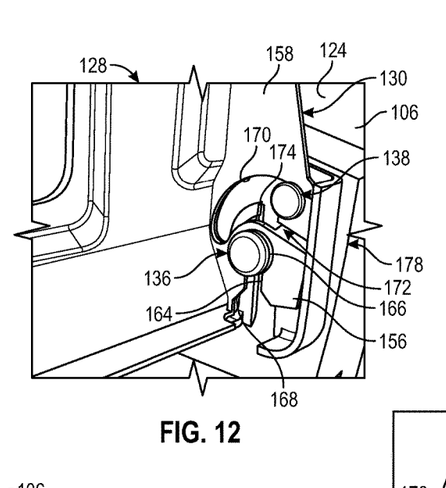
FIG. 12 is a schematic, perspective view of part of the release mechanism shown in FIG. 6 when the armrest in the closed position.
Figure 13:
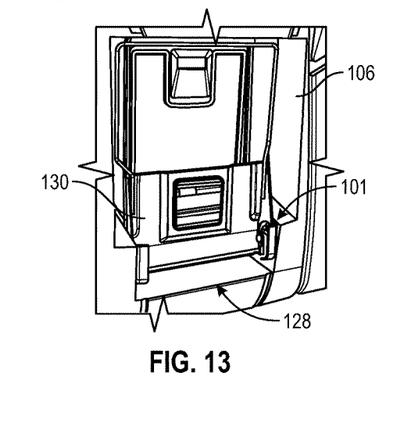
FIG. 13 is a schematic, perspective view of the seatback body of the seat assembly and the armrest in the closed position.

With reference to FIGS. 12-14, the armrest 112 can be disposed in the closed position relative to the seatback body 106. While the armrest 112 is the closed position, a vehicle occupant can sit on the seat base 102 and rest his back on the armrest 112. In the closed position, the armrest 112 is movably coupled to the seatback body 106, but the armrest 112 cannot be decoupled from the seatback body 106 due to the position, size, and orientation of the first pin 136 and second pin 138 in the opening 162 and the curved slot 170, respectively. Specifically, when the armrest 112 is in the closed position, the first pin 136 is oriented relative to the opening 162 of the coupling flange 130 such that the second locking portion 149 cannot exit the opening 162. In the depicted embodiment, the cross-sectional dimension D2 (e.g., width) of the second locking portion 149 of the first pin 136 is larger than the cross-sectional dimension D3 (e.g., width) of the linear slot 164, thereby preventing the first pin 136 from being received by the linear slot 164 when the armrest 112 is in the closed position. Furthermore, when the armrest 112 is in the closed position, the second pin body 154 of the second pin 138 is not aligned with the first aperture portion 174 of the aperture 172, thereby preventing the second pin 138 from being received by the aperture 172 of the coupling flange 130. As a consequence, the second pin 138 remains in the curved slot 170 and, therefore, the armrest 112 cannot be decoupled from the seatback body 106. The release mechanism 101 may further include a cover frame 178 coupled between the sidewall 124 and the coupling flange 130. The cover frame 178 at least partially covers the coupling flange 130 in order to prevent interference with the release mechanism 101 during use. In addition, the cover frame 178 includes a linear passage 180 parallel to the linear slot 164 in order to allow the first pin 136 to facilitate decoupling the armrest 112 from the seatback body 106 when the armrest 112 is in the release position.

Figure 15:
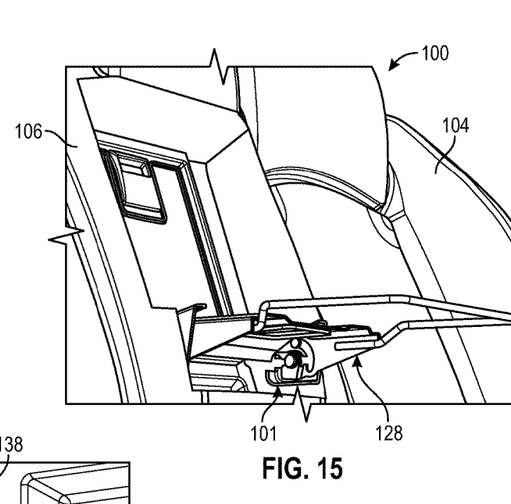
FIG. 15 is a schematic, perspective view of the seatback body and the armrest (without the cushion) in the open position.
Figure 16:
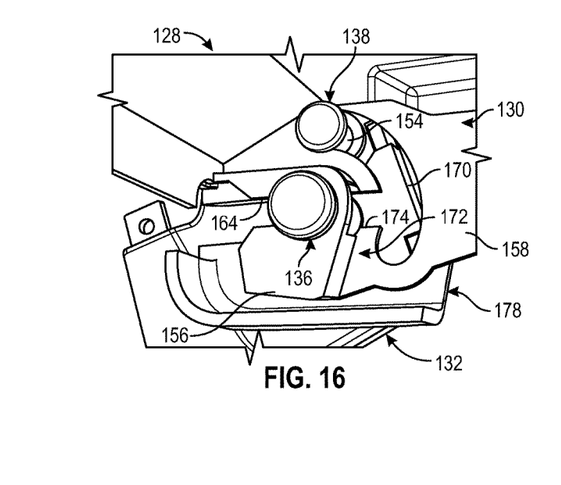
FIG. 16 is a schematic, perspective view of part of the release mechanism shown in FIG. 6 when the armrest is in the open position.
Figure 17:
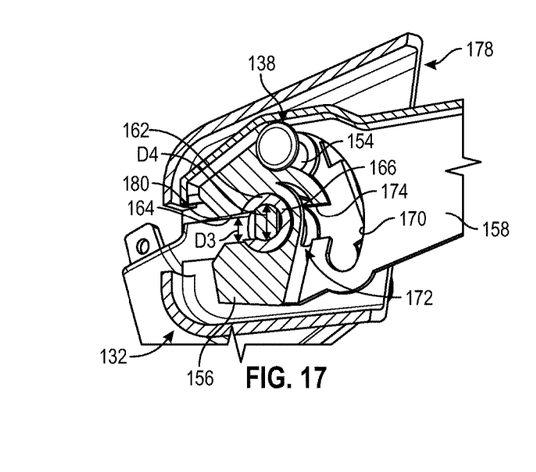
FIG. 17 is a schematic, perspective, cross-sectional view of part of the release mechanism shown in FIG. 6 when the armrest is in the open position.
Figure 18:
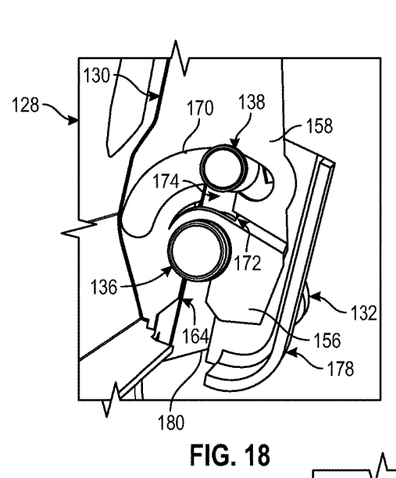
FIG. 18 is a schematic, perspective view of part of the release mechanism, shown in FIG. 6, when the armrest is in the release position.
Figure 19:
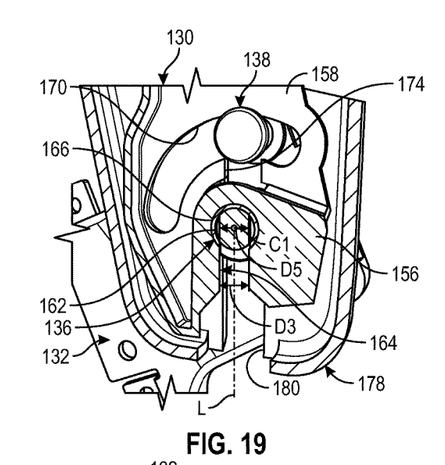
FIG. 19 is a schematic, perspective, cross-sectional view of part of the release mechanism shown in FIG. 6 when the armrest is in the release position.
Figure 20:
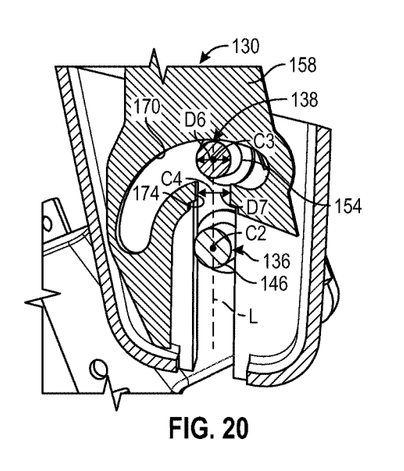
FIG. 20 is another schematic, perspective, cross-sectional view of part of the release mechanism, shown in FIG. 6, when the armrest is in the release position.
Figure 21:
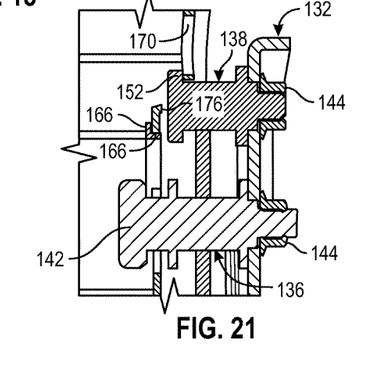
FIG. 21 is a schematic, cross-sectional view of part of the release mechanism while the armrest is being decoupled from the seatback.
Figure 22:
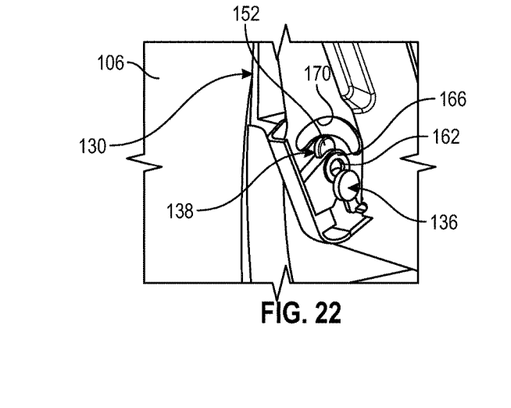
FIG. 22 is a schematic, perspective view of part of the release mechanism while the armrest is being decoupled from the seatback.

With reference to FIGS. 15-17, as discussed above, a vehicle occupant can move the armrest 112 away from the seatback body 106 in order to move the armrest 112 in the direction indicated by arrow A (FIG. 2) and in the opposite direction. While the armrest 112 is the open position, a vehicle occupant can sit on the seat base 102 and rest his arm on the armrest 112. In the open position, the armrest 112 is movably coupled to the seatback body 106, but the armrest 112 cannot be decoupled from the seatback body 106 due to the position, size, and orientation of the first pin 136 and second pin 138 in the opening 162 and the curved slot 170, respectively. In particular, when the armrest 112 is in the open position, the first pin 136 is oriented relative to the opening 162 of the coupling flange 130 such that the second locking portion 149 cannot exit the opening 162. In the depicted embodiment, the cross-sectional dimension D4 (e.g., width) of the second locking portion 149 of the first pin 136 is larger than the cross-sectional dimension D3 (e.g., width) of the linear slot 164, thereby preventing the first pin 136 from being received by the linear slot 164 when the armrest 112 is in the closed position. Moreover, when the armrest 112 is in the open position, the second pin body 154 of the second pin 138 is not aligned with the first aperture portion 174 of the aperture 172, thereby preventing the second pin 138 from being received by the aperture 172 of the coupling flange 130. As a result, the second pin 138 remains in the curved slot 170 and, therefore, the armrest 112 cannot be decoupled from the seatback body 106.

With reference to FIGS. 4 and 18-22, the armrest 112 can be decoupled from the seatback body 106 only when the armrest 112 is in the release position due to the position, size, and orientation of the first pin 136 and the second pin 138 in the opening 162 and the curved slot 170, respectively. In particular, when the armrest 112 is in the release position, the first pin 136 is oriented relative to the opening 162 of the coupling flange 130 such that the second locking portion 149 can exit the opening 162. In the depicted embodiment, the cross-sectional dimension D5 (e.g., width) of the second locking portion 149 of the first pin 136 is smaller than the cross-sectional dimension D3 (e.g., width) of the linear slot 164, thereby allowing the first pin 136 to exit the opening 162 and enter the linear slot 164 when the armrest 112 is in the release position. Furthermore, when the armrest 112 is in the release position, the longitudinal axis L of the linear slot 164 intersects the geometric center C1 of the second locking portion 149 and the geometric center C2 of the first pin body 146 of the first pin 136 in order to facilitate removal of the armrest 112 from the seatback body 106.

The second pin body 154 of the second pin 138 is aligned with the first aperture portion 174 of the aperture 172 when the armrest 112 is in the release position, thereby allowing the second pin 138 to exit the curved slot 170 of the coupling flange 130. The cross-sectional dimension D6 (e.g., diameter) of the second pin body 154 of the second pin 138 is smaller than the cross-sectional dimension D7 (e.g., width) of the first aperture portion 174 of the aperture 172, thereby allowing the second pin 138 to exit the curved slot 170 when the armrest 112 is in the release position. In the depicted embodiment, when the armrest 112 is in the release position, the longitudinal axis L of the linear slot 164 intersects the geometric center C3 of the second pin body 154 of the second pin 138 and the geometric center C4 of the first aperture portion 174 in order to facilitate removal of the armrest 112 from the seatback body 106.

Once the armrest 112 is in the release position, the vehicle occupant applies the force F (FIG. 4) to the armrest 112 in order to move the armrest 112 away from the seatback body 106. As the armrest 112 moves away from the seatback body 106, the first pin 136, the second pin 138, and the coupling frame 132 remain stationary relative to the seatback body 106 while the second enlarged end portion 152 of the second pin 138 is received by the second aperture portion 176 of the aperture 172. For this reason, the second aperture portion 176 of the aperture 172 is larger than the second enlarged end portion 152 of the second pin 138. In addition, the linear slot 164 receives the second locking portion 149 of the first pin 136 while the armrest 112 moves away from the seatback body 106 and, therefore, guides the movement of the armrest 112.

Figure 23:
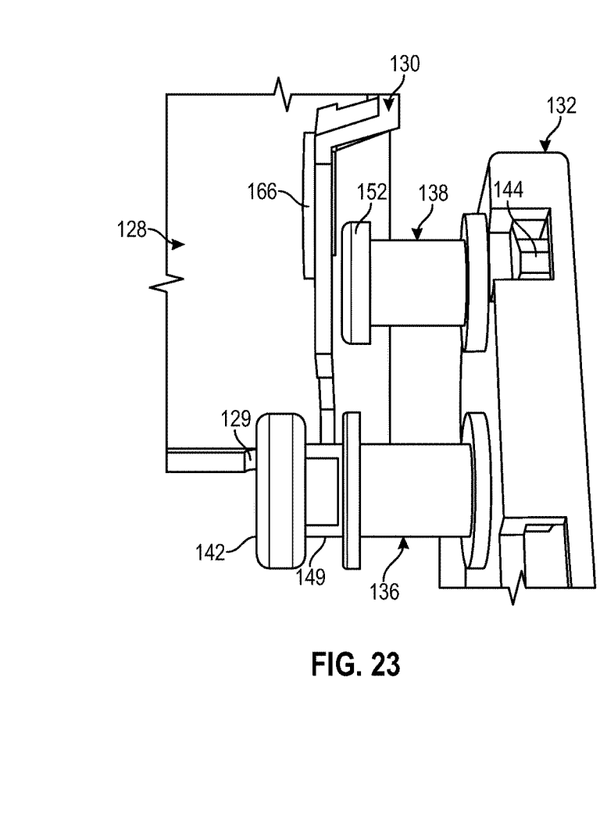
FIG. 23 is a schematic, perspective, front view of part of the release mechanism when the armrest is decoupled from the seatback.
Figure 24:
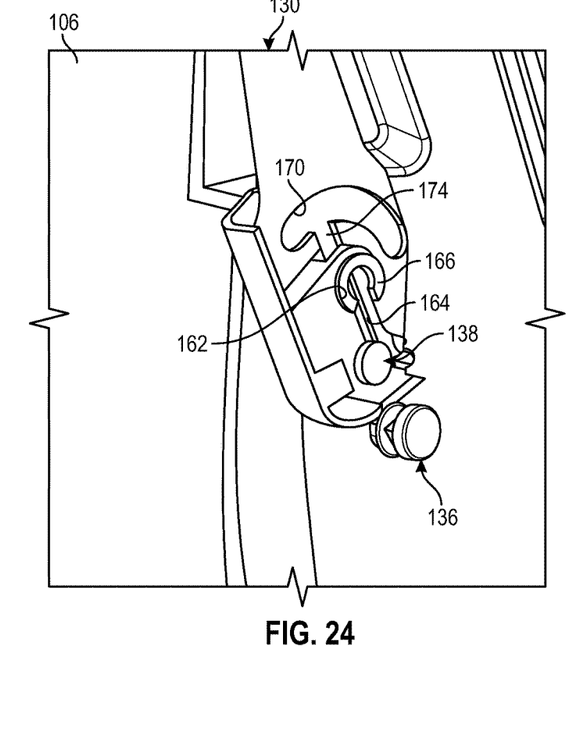
FIG. 24 is a schematic, perspective view of part of the release mechanism when the armrest is decoupled from the seatback.

With specific reference to FIGS. 23 and 24, continued movement of the armrest 112 away from the seatback body 106 causes the second pin 138 to completely decouple from the coupling flange 130. The support frame 128 may include a hole 129 configured, shaped, and sized to receive the first enlarged end portion 142 of the first pin 136 in order to allow the support frame 128 to be completely decoupled from the first pin 136 while the armrest 112 is moved away from the seatback body 106. After completely removing the armrest 112 from the seatback body 106, the armrest 112 may be placed on the seat base 102 and can therefore serve as a booster seat for children.

While the best modes for carrying out the teachings have been described in detail, those familiar with the art to which this disclosure relates will recognize various alternative designs and embodiments for practicing the teachings within the scope of the appended claims.

The invention claimed is:
1. A seat assembly, comprising:
a seat base;
a seatback disposed proximal to the seat base, wherein the seatback includes:
   a seatback body;
   an armrest movably coupled to the seatback body such that the armrest is movable relative to the seatback body among a closed position, a release position, and an open position, wherein the armrest includes a support frame;
   wherein the armrest is removably coupled to the seatback body such that the armrest is removable from the seatback body only when the armrest is in the release position;
   a release mechanism movably coupling the seatback body to the armrest, wherein the release mechanism includes a coupling flange extending from the support frame, and the release mechanism removably couples the support frame to the seatback body such that the armrest is removable from the seatback body only when the armrest is in the release position; and
   wherein the release mechanism includes a coupling frame movably coupling the support frame to the seatback body via the coupling flange, the coupling frame is directly coupled to the seatback body, the release mechanism includes a pin rotatably coupling the coupling flange to the coupling frame such that the support frame is rotatable relative to the coupling frame about the pin, the coupling flange includes a first flange portion, a second flange portion coupled to the first flange portion, and a connecting wall coupled between the first flange portion and the second flange portion, the first flange portion is spaced apart from the second flange portion along a first direction when the armrest is in the closed position, the coupling flange has an opening extending through the first flange portion, and the opening is sized to receive the pin.

2. The seat assembly of claim 1, wherein the coupling flange has a linear slot extending through the first flange portion, the linear slot extends along a second direction when the armrest is in the closed position, the second direction is perpendicular to the first direction, and the linear slot is in direct communication with the opening.

3. The seat assembly of claim 2, wherein the linear slot is sized to receive the first pin only when the armrest is in the release position.

4. The seat assembly of claim 3, wherein the pin is a first pin, and the release mechanism includes a second pin coupled between the coupling frame and the coupling flange, and the coupling flange defines a curved slot extending through the second flange portion, and the curved slot is sized to slidably receive the second pin such that the second pin and the curved slot guide a movement of the armrest between the open position and the closed position.

5. The seat assembly of claim 4, wherein the coupling flange has an aperture, the aperture extends through the second flange portion and the connecting wall, and the aperture is sized to at least partially receive the second pin.

6. The seat assembly of claim 5, wherein the aperture is in direct communication with the curved slot, and the second pin is aligned with the aperture only when the armrest is in the release position in order to allow the aperture to receive the second pin only when the armrest is in the release position.

7. The seat assembly of claim 1, wherein the seatback body has a first body surface and a second body surface opposite the first body surface, the armrest has a first armrest surface and a second armrest surface opposite the first armrest surface, and an angle is defined from the first body surface to the first armrest surface, and the angle is 24° when the armrest is in the release position.

8. The seat assembly of claim 7, wherein the angle is 0° when the armrest is in the closed position, and the angle is 110° when the armrest is in the open position.

9. The seat assembly of claim 1, wherein the seatback body has a first seatback edge and a second seatback edge opposite the first seatback edge, the seat base is closer to the second seatback edge than to the first seatback edge, and the armrest is movably coupled to the seatback body at a location that is closer to the second seatback edge than to the first seatback edge.

10. A seatback, comprising:
a seatback body;
an armrest movably coupled to the seatback body such that the armrest is movable relative to the seatback body among a closed position, a release position, and an open position;
wherein the armrest includes a support frame, the armrest is removably coupled to the seatback body such that the armrest is removable from the seatback body only when the armrest is in the release position, and the release position is between the open position and the closed position;
a release mechanism including a coupling frame movably coupling the support frame to the seatback body, wherein the release mechanism includes a coupling flange extending from the support frame and a pin rotatably coupling the coupling flange to the coupling frame; and
wherein the coupling flange includes a first flange portion, a second flange portion coupled to the first flange portion, and a connecting wall coupled between the first flange portion and the second flange portion, the first flange portion is spaced apart from the second flange portion when the armrest is in the closed position, the coupling flange has an opening extending through the first flange portion, and the opening is sized to receive the pin.

11. The seatback of claim 10, wherein the release mechanism removably couples the support frame to the seatback body such that the armrest is removable from the seatback body only when the armrest is in the release position.

12. The seatback of claim 11, wherein the coupling frame is movably coupled to the support frame to the seatback body via the coupling flange.

13. The seatback of claim 12, wherein the coupling frame is directly coupled to the seatback body, and the pin rotatably couples the coupling flange to the coupling frame such that the support frame is rotatable relative to the coupling frame about the pin.

14. A vehicle, comprising:
a vehicle body defining a passenger compartment;
a seat assembly disposed inside the passenger compartment, wherein the seat assembly includes:
a seat base disposed inside the passenger compartment;
a seatback disposed proximal to the seat base, wherein the seat back includes:
a seatback body having a first body surface and a second body surface opposite the first body surface;
an armrest having a first armrest surface and a second armrest surface opposite the first armrest surface, wherein the armrest includes a support frame, the armrest is movably coupled to the seatback body such that the armrest is movable relative to the seatback body among a closed position, a release position, and an open position, and the armrest is removably coupled to the seatback body such that the armrest is removable from the seatback body only when the armrest is in the release position;
wherein an angle is defined from the first body surface to the first armrest surface, and the angle is between 15° and 100° when the armrest is in the release position;
a release mechanism including a coupling frame movably coupling the support frame to the seatback body, wherein the release mechanism includes a coupling flange extending from the support frame and a pin rotatably coupling the coupling flange to the coupling frame; and
wherein the coupling flange includes a first flange portion, a second flange portion coupled to the first flange portion, and a connecting wall coupled between the first flange portion and the second flange portion, the first flange portion is spaced apart from the second flange portion when the armrest is in the closed position, the coupling flange has an opening extending through the first flange portion, and the opening is sized to receive the pin.

15. The vehicle of claim 14, wherein the angle is 0° when the armrest is in the closed position, and the angle is 110° when the armrest is in the open position.

* * * * *

UNITED STATES PATENT AND TRADEMARK OFFICE
CERTIFICATE OF CORRECTION

Page 1 of 1

PATENT NO. : 9,616,787 B2
APPLICATION NO. : 14/848997
DATED : April 11, 2017
INVENTOR(S) : Fernando A. Siqueira et al.

It is certified that error appears in the above-identified patent and that said Letters Patent is hereby corrected as shown below:

In the Claims

Column 10, Line 55, cancel the text beginning with "3. The seat assembly" to and including "release position." in Column 10, Line 57, and insert the following claim:

--3. The seat assembly of claim 2, wherein the linear slot is sized to receive the pin only when the armrest is in the release position.--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*